United States Patent
Campagna et al.

(10) Patent No.: US 8,078,293 B2
(45) Date of Patent: Dec. 13, 2011

(54) SYSTEM AND METHOD FOR ROUTING SELECTION USING STATISTICAL DATA

(75) Inventors: Matthew J. Campagna, Ridgefield, CT (US); Bradley R. Hammell, Bridgeport, CT (US); Erik D. N. Monsen, Shelton, CT (US); Ronald Reichman, Trumbull, CT (US); Frederick W. Ryan, Jr., Oxford, CT (US); Michael P. Swenson, Danbury, CT (US); Robert A. Cordery, Danbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 537 days.

(21) Appl. No.: 11/844,437

(22) Filed: Aug. 24, 2007

(65) Prior Publication Data

US 2009/0055000 A1 Feb. 26, 2009

(51) Int. Cl.
*G05B 13/02* (2006.01)
(52) U.S. Cl. .......................................................... 700/32
(58) Field of Classification Search .................. 700/32, 700/400, 401, 402, 410; 705/400, 401, 402, 705/410
See application file for complete search history.

(56) References Cited

U.S. PATENT DOCUMENTS

| | | | |
|---|---|---|---|
| 5,068,797 A | | 11/1991 | Sansone et al. |
| 5,995,950 A * | | 11/1999 | Barns-Slavin et al. ....... 705/402 |
| 6,571,213 B1 * | | 5/2003 | Altendahl et al. ................ 705/1 |
| 6,963,861 B1 | | 11/2005 | Boucher et al. |
| 7,693,735 B2 * | | 4/2010 | Carmi et al. .................. 705/7.16 |
| 2003/0046133 A1 * | | 3/2003 | Morley et al. ..................... 705/8 |

FOREIGN PATENT DOCUMENTS

| | | | |
|---|---|---|---|
| EP | 1688887 A2 | | 8/2006 |
| WO | WO0171603 | * | 9/2001 |

OTHER PUBLICATIONS

"Address Doctor",;Mar. 8, 2005; pp. 1-2.*
"Best Practices for Optimizing Last Mile Pick Up and Delivery Operations" Jun. 15, 2007; The Descrates Systems Group; pp. 1-7.*
Best Practices for Optimizing Last Mile Pick Up and Delivery Operatios:;Jun. 17, 2007; The Descartes Systems Group-Business White Paper; pp. 1-8.*
Walker, Alex; "The Last Mile is the Longest Mile"; Jun./Jul. 2006; AllBusiness; pp. 1-3.*

* cited by examiner

*Primary Examiner* — Albert Decady
*Assistant Examiner* — Chad Rapp
(74) *Attorney, Agent, or Firm* — George M. Macdonald; Charles R. Malandra, Jr.

(57) ABSTRACT

A system, method, and medium, the method including receiving parameter information associated with a mailer, associating the parameter information with a mailing, receiving statistical information, the statistical information including historical performance data of at least one carrier, determining a delivery sequence for the mailing based on the received mailer parameter information and the statistical information, and outputting the determined delivery sequence for the mailing.

18 Claims, 2 Drawing Sheets

SYSTEM AND METHOD FOR ROUTING SELECTION USING STATISTICAL DATA

BACKGROUND

The present invention is related to routing mailings, and particularly to such systems and methods that provide a routing based on statistical data.

The proliferation of service providers, offered services, carriers, carrier requirements, and electronic delivery options has resulted in a multitude of delivery options for a mailing. For example, a plurality of carriers may be potentially available to deliver a mailing in a given country or region. Additionally, user preferences may contribute to the complexity and possible delivery options.

Accordingly, it would be desirable to efficiently determine what delivery options are available for delivery of a mailing.

SUMMARY

According to an aspect of the present invention, a method includes receiving parameter information associated with a mailer, associating the parameter information with a mailing, receiving statistical information, the statistical information including historical performance data of at least one carrier, determining a delivery sequence for the mailing based on the received mailer parameter information and the statistical information, and outputting the determined delivery sequence for the mailing.

In some embodiments, the method may further include an analysis of previously received parameter information associated with the mailer. The result of such an analysis may be used in determining at least some values for the parameter information received from the mailer based on the analysis.

In still other embodiments, the statistical information related to the methods herein may be received from at least one of a set of carriers and the recipient.

In some embodiments herein, the statistical information is received by an information broker. In some such embodiments, at least a portion of the statistical information received by the information broker is shared with the information broker, whereas some of the statistical information is not shared with the information broker.

In some aspects of the present disclosure, a system including an information broker and a so-called enhanced "mail box" is provided. The mail box may include memory storing processor-executable instructions, and a processor in communication with the memory and operative in conjunction with the memory to execute the stored instructions. The processor may be operative, in conjunction with the memory, to execute the stored instructions to receive parameter information associated with a mailer, associate the parameter information with a mailing, receive statistical information from the information broker, the statistical information including historical performance data of at least one carrier, determine a delivery sequence for the mailing based on the received mailer parameter information and the statistical information, and output the determined delivery sequence for the mailing.

In some embodiments herein, a medium having machine-executable instructions stored thereon is provided. The medium may include instructions to receive parameter information associated with a mailer, instructions to associate the parameter information with a mailing, instructions to receive statistical information where the statistical information includes historical performance data of at least one carrier, instructions to determine a delivery sequence for the mailing based on the received mailer parameter information and the statistical information, and instructions to output the determined delivery sequence for the mailing.

Therefore, it should now be apparent that the invention substantially achieves all the above aspects and advantages. Additional aspects and advantages of the invention will be set forth in the description that follows, and in part will be obvious from the description, or may be learned by practice of the invention. Various features and embodiments are further described in the following figures, description and claims.

DESCRIPTION OF THE DRAWINGS

The accompanying drawings illustrate presently preferred embodiments of the invention, and, together with the general description given above and the detailed description given below, serve to explain the principles of the invention. As shown throughout the drawings, like reference numerals designate like or corresponding parts.

DETAILED DESCRIPTION

Figure 1:
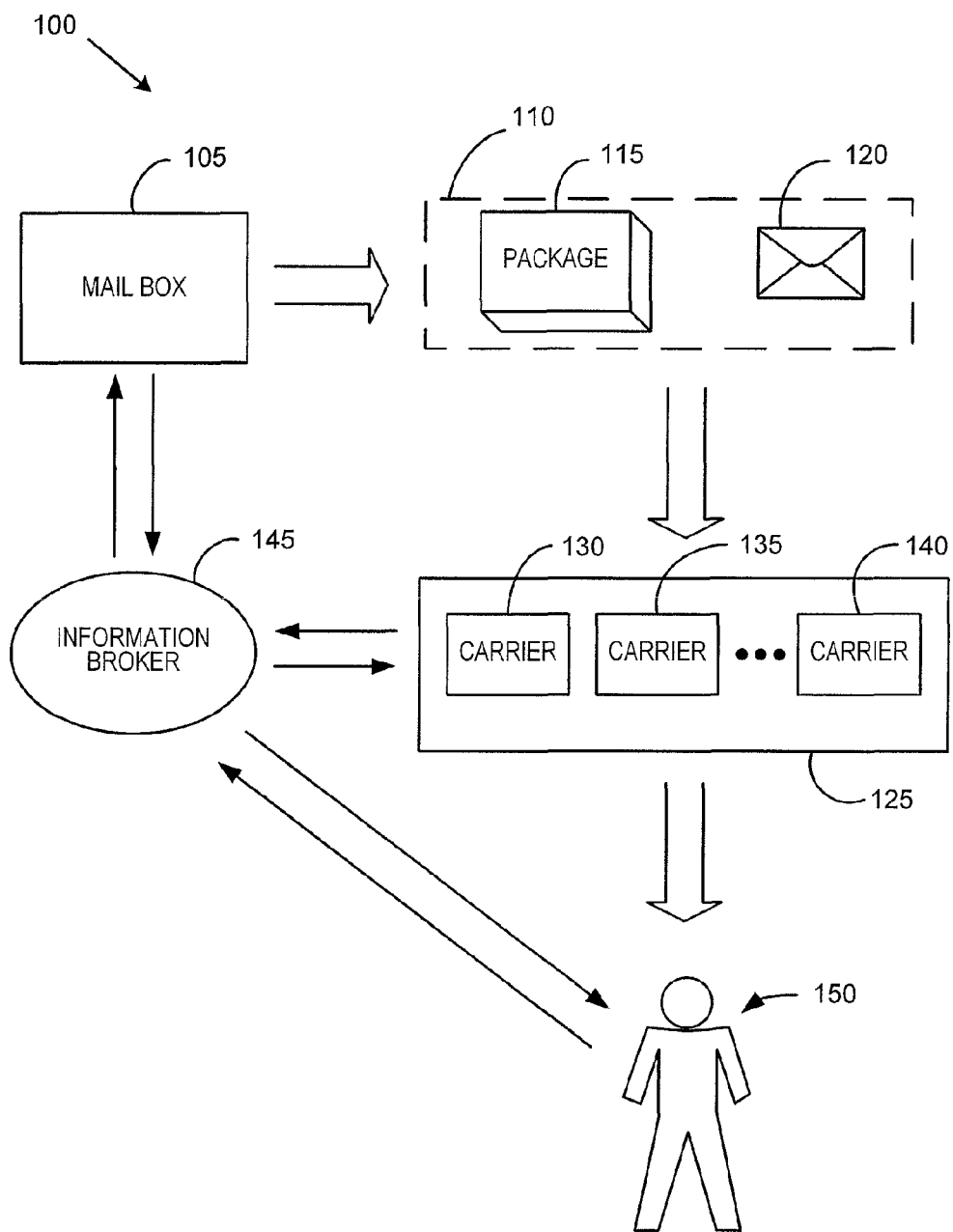
FIG. 1 is a block diagram of a system, according to aspects of the present invention.

The present invention, in certain of its aspects, may provide a routing selection method and system for a mailing. FIG. 1 is an illustrative block diagram of a system, in accordance with the present invention, generally represented by reference numeral 100. System 100 includes a mail box 105 for the intake and/or processing of information related to a mailing 110 that is to be delivered by carriers 125 to recipient 150. System 100 further includes an information broker 145 that facilitates a routing selection aspect of the current invention. Information broker 145 may communicate with one or more of mail box 105, carriers 125, and recipient 150.

In accordance with the present disclosure, a mailer (not shown) may enter parameter information associated with a mailing 110. The parameter information may convey information related to a particular mailing or type of mailing (e.g., 115, 120). The parameter information may further be associated with the mailing or mailing type. Statistical information, including historical information related to carriers 125, may be used in combination with the parameter information to determine a routing sequence for the delivery of the mailing. Information broker 145 may support or facilitate the routing sequence determination process by communicating, gathering, collecting, saving, receiving, and forwarding parameter information, statistical information, and recipient information to and from mail box 105, carriers 125, and recipient 150.

In some aspects, mail box 105 may be a self-contained, dedicated hardware and/or software device capable of performing all of the functions associated therewith and described herein. In some embodiments, mail box 105 may include one or more hardware and/or software components capable of performing some or all of the functions associated therewith and described herein. For example, mail box 105 may be a computer program, application, or agent. Another example includes a mailing machine.

In one embodiment, mail box 105 includes a feeder, a scanner, a selection engine, a network (or other communication) interface, a printer, and an output scanner. Output bin(s) may also be included to provide a holding area to hold mailings 110 until pickup by carriers 125. The communication interface of mail box 105 may be capable of wired or wireless communication. It should be appreciated that the network or communication protocol used by mail box 105 may be varied to interface and communicate with both known and future-developed communication protocols and systems (whether industry standardized or proprietary).

In the instance where mail box 105 includes a scanner, the scanner may be used to read information from mailing 115, 120. The scanned information may be interpreted by the scanner using OCR (optical character recognition), barcode recognition, handwriting recognition techniques, other indicia recognition techniques, and combinations thereof to determine an intended recipient for the mailing. Information received from the mailing may include recipient name, address, and additionally, other desired service requirements. In some embodiments, mail box 105 performs an address cleansing operation based on the received mailer parameter information and determines a recipient based on the address cleansing. Other desired service requirements or constraints may include a desired price sensitivity, a delivery time and/or date, etc.

Mail box 105 may receive or obtain parameter information from information broker 145, a database or other data store, and third party data sources.

The selection engine of mail box 105 may be implemented by, for example, a memory storing processor executable instructions and a processor in communication with the memory. The selection engine operation may use the parameter information received from the mailing, the mailer, or otherwise determined as a basis for selecting the particular carrier 130, 135, 140 to use in determining a routing sequence for mailing 110 to recipient 150.

In some embodiments, mail box 105 may print appropriate forms or envelope/package markings and labels. The printed material may be coded so as to conceal and/or obscure at least some of the information printed on the forms, markings, and labels so that such printed information is not readily read by others. In some embodiments, the information may be coded to keep it confidential to at least one of carriers 130, 135, 140. The information may be coded such that it is readable only by the carrier(s) selected in a routing selection process to deliver the mailing. In some instances, the printed information may be concealed from all, some, or none of the carriers 125.

The sorter of mail box 105, if so equipped, may be used to sort the appropriately labeled mailings 115, 120 to output bins for the carriers 130, 135, 140 selected to deliver mailing 115, 120.

Recipient 150 may provide recipient parameter information that may be associated with mailings that are intended for delivery to the recipient. Such recipient parameter information may include a preferred delivery mechanism that may vary depending on the type of mailing, a desired delivery time, an alternate recipient address, and delivery restrictions such as acceptable delivery time, acceptable carriers, acceptable payment mechanisms, requirements for embedded sensors (e.g., over-temperature, radiation, accelerometers, etc.), a electronic delivery preference, and approved (or blocked) mailer's list. In some aspects herein, the recipient parameter information may include historical data regarding past mailings to recipient 150. Such historical data may include actual delivery times from various carriers 125 and provide real-world data as opposed to calculate, planned or targeted delivery times associated with recipient 150.

Figure 2:
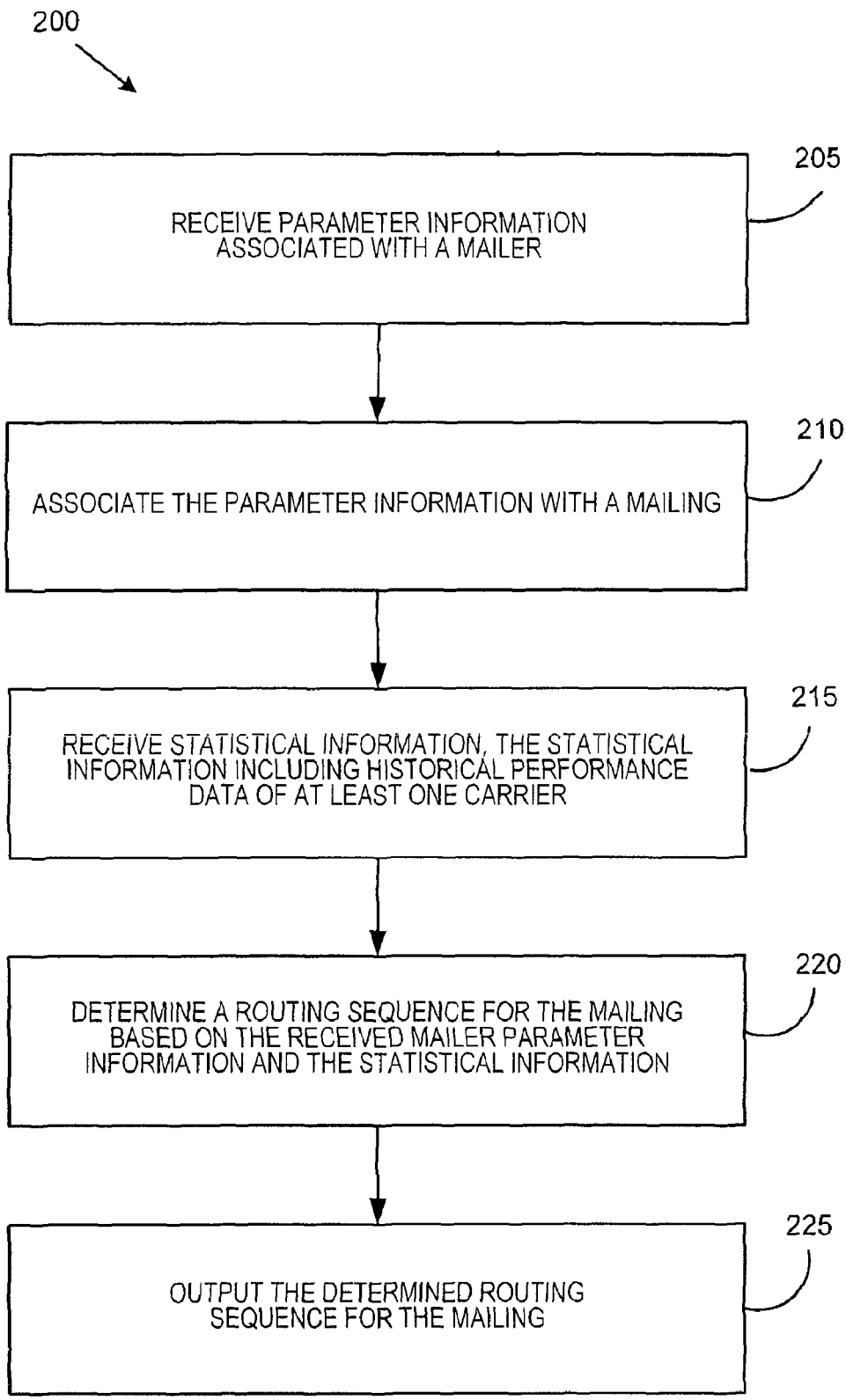
FIG. 2 is a flow chart of an exemplary process, according to aspects herein.

Referring to FIG. 2, there is shown a flow diagram of a process 200, in accordance with some embodiments herein. At operation 205, parameter information associated with a mailer is received. The parameter information may be received directly or indirectly from a mailer. Further, the parameter information may specify or identify the mailer (i.e., sender), describe the type of mailing, indicate a desired payment mechanism, identify the address of recipient 150, delivery constraints, pick-up/drop-off constraints, and an provide indication of the purpose for the mailing (e.g., legal requirements, insurance desired, customs documentation, etc.).

The mailing type may include a physical object such as a letter 120, document, or package 115 or it may include an electronic document (e.g., one file) or electronic package (e.g., multiple electronic files). The desired payment parameter may relate to a listing of one or more desired payment mechanisms. This listing may be prioritized.

The parameter information related to the delivery constraints may include a preference regarding how the mailing is transported (e.g., land, air, sea, refrigerated, and a "do not care" indicator), security requirements, price sensitivity constraints, and a desired delivery type. The desired delivery type may include an exact date, an expiration (i.e., no later than) date, and an approximate delivery date.

The parameter information related to the pick-up/drop-off constraints may indicate a specific pick-up and/or delivery time, an approximate pick-up/drop-off time, and other pick-up/drop-off requirements.

In some embodiments, specific values for some, all, or none of the parameter information associated with a mailer must be specified. In some instances, default values may be used for some of the parameter information based on, for example, a mailer profile, user specified settings, or analysis of previously received parameter information associated with the mailer.

At operation 210, the parameter information is associated with the mailing 110. Operation 210 may be accomplished by an analysis of the received parameter information or specified by the mailer. It is noted that operation 210 may be accomplished as part of another process, including operation 205.

At operation 215, statistical information, including historical performance data of at least one of carriers 125, is received. The statistical data may be received by information broker 145. The statistical data may be obtained from a variety of sources including, for example, posts, alternate carriers, and other data sources. The statistical data may include rates, previous real-world tracking information, published performance history and guarantees, and other information needed for induction such as, for example, weight, markings, addressing requirements, payment terms, volume requirements, pick-up times and delivery areas.

The previous tracking information may be collected, obtained, compiled, stored, or otherwise accessible for use by the methods and systems disclosed herein.

The various components of the statistical data may be needed to determine the routing sequence determination process herein since such a determination may consider the requirements and constraints specified in the statistical data.

In some embodiments, some, all, or none of the information received by or communicated by information broker 145 may be secured or encrypted so that it may not be interpreted by the information broker or alternatively may be shared in an open communication or secure communication that can be interpreted by the information broker. In other embodiments, the information is kept private from information broker 145. That is, although certain information (e.g., statistical information) is at least communicated to, from, or between various entities of system 100 by information broker 145, the contents of that information may not be shared with the information broker (e.g., by encrypting the information). For example, with regard to rate information, Carriers may not wish to share rates applicable to particular customers with a broker. In this manner, the methods and systems may be implemented while maintaining a desired level of security regarding the information communicated.

In some embodiments, information such as mailer parameter information, recipient parameter information, statistical information, and carrier information may be directly sent to mail box 105. In this manner, information broker 145 may be, perhaps optionally or selectively, involved with certain aspects of the methods and systems herein.

In some embodiments, communication to, from, or between various entities of system 100 may be accomplished periodically, on demand, in a batch mode, automatically as scheduled, and in response to a predetermined event such as, for example, a change in carrier rates, a labor strike and other interruptions in carrier service, etc. In some embodiments, mail box 105 may communicate with carrier 125 and/or recipient 150, either directly or via information broker 145.

In some embodiments, carrier 125 tracking information may be communicated to one or more of mail box 105, information broker 145, and recipient 150.

At operation 220, a determination is made regarding the routing sequence for the mailing based on the received mailer parameter information and the statistical information. The delivery sequence may list more than one of the carriers 130, 135, 145 where there is a choice of carriers 125. The determination may be performed by a selection engine of mail box 105. The determination may include a matching process of the various mailer, carrier, and recipient criteria included in the parameter information and the statistical information to yield at least one transport and delivery option.

It should be appreciated that in some instances, not all requested, desired, or required constraints may be met in operation 220. In such cases, the present invention may provide a "next best" or alternative routing sequence option. The next best option may be provided by a concierge service that determines an alternative routing option.

In some embodiments, a score is generated for each potential delivery option. The score may be useful in providing a relative ranking of the determined routing sequence delivery options.

At operation 225, the determined routing sequence for mailing 100 is output. Further, the output routing sequence may be used to effectuate the routing and delivery of the mailing 110 in accordance with the determined routing sequence, including the mode of delivery, time of pick-up and drop-off, carrier, and other delivery criteria. In some embodiments, all or fewer than all of a plurality of determined routing sequences may be output at operation 225. In some embodiments, the top rated or highest scored routing sequence for the mailing may be output at operation 225.

According to some embodiments, the number of determined routing sequences output at operation 225 may be based on a mailer's preference, a system value, or the actual number of routing sequences determined at operation 220.

In an instance, mailing 110 includes an electronic mailing (e.g., electronic document files, messages, digital media files, etc.) that is to be delivered electronically, then the carrier selected for the delivery may be limited to those carriers 130, 135, 140 capable of fulfilling an electronic delivery. Electronic delivery may include a completely electronic delivery of the mailing's electronic contents, electronic delivery and a physical output of the electronic contents of the mailing (e.g., a printout of electronic documents), an electronic delivery alone, and a remote printing of the electronic contents at a recipient's destination address (e.g., physical address or a email, network portal, message, or web address).

The system and methods disclosed herein may be implemented, facilitated, and advanced by code, instructions, and software embodied on a medium. The medium may include any current known and future known medium, including a memory. The code, instructions, and software embodied on the medium may be at least accessible to a processor that operates to execute the code, instructions, and software embodied on the medium.

The above description, and the flow charts herein, are not meant to imply a fixed order of the enumerated process steps. Rather, the process steps may be performed in any order that is practicable.

In the above description, a so called "mail box" is used in the representative embodiments for illustrative purposes. Of course, it includes a mail processing machine as described and is not limited to previous notions of a traditional street corner mail box. For example, such a mail processing machine may be located in an internal company mailroom, a public space such as a shopping mall or a traditional postal induction facility including a post office.

A number of embodiments of the present invention have been described. Nevertheless, it will be stood that various modifications may be made without departing from the spirit and scope of the invention. Other variations relating to implementation of the functions described herein can also be implemented. Accordingly, other embodiments are within the scope of the following claims.

What is claimed is:

1. A method comprising:
   receiving parameter information including delivery constraints associated with a mailer;
   associating the parameter information with a mailing;
   receiving statistical information, the statistical information including historical delivery guarantee performance data of at least two carriers;
   determining at least one routing sequence using at least one of the at least two carriers for the mailing based on the received mailer parameter information and the statistical information;
   outputting the at least one determined routing sequence for the mailing; and
   receiving parameter information associated with a recipient,
   wherein said determining is further based on the received recipient parameter information, the at least one routing sequence includes two routing sequences and outputting the at least one determined routing sequence includes outputting two routing sequences.

2. The method of claim 1, wherein the mailer parameter information is at least one selected from the group consisting of: a mailer identifier, a type of mailing, a desired payment mechanism, a recipient address, a delivery constraint, pick-up/drop-off constraints, a purpose for mailing, and combinations thereof.

3. The method of claim 1, wherein the mailer parameter information includes default values.

4. The method of claim 1, further comprising:
   analysis of previously received parameter information associated with the mailer; and
   determining at least some values for the parameter information received from the mailer based on the analysis.

5. The method of claim 1, wherein the statistical information is received from at least one of the at least one carrier and a recipient.

6. The method of claim 1, wherein the statistical information is received by an information broker.

7. The method of claim 6, wherein at least a portion of the statistical information received by the information broker is shared with the information broker.

8. The method of claim 1, wherein the statistical information is received according to the following: periodically, on demand, based on the occurrence of a predetermined event, and combinations thereof.

9. The method of claim 1, wherein the mailing comprises at least one of a physical document and electronic data.

10. A system comprising:
an information broker; and
a mail box, the mail box comprising:
memory storing processor-executable instructions; and
a processor in communication with the memory and operative in conjunction with the memory to execute the stored instructions to:
receive parameter information including delivery constraints associated with a mailer;
associate the parameter information with a mailing;
receive statistical information from the information broker, the statistical information including historical delivery guarantee performance data of at least two carriers;
determining at least one routing sequence using at least one of the at least two carriers for the mailing based on the received mailer parameter information and the statistical information; and
output the at least one determined routing sequence for the mailing, wherein,
the processor is further operative to receive parameter information associated with a recipient, the at least one routing sequence includes two routing sequences and outputting the at least one determined routing sequence includes outputting two routing sequences.

11. The system of claim 10, wherein the processor is further operative to:
perform address cleansing based on the received mailer parameter information; and
determine a recipient based on the address cleansing.

12. The system of claim 10, wherein the mailer parameter information is at least one selected from the group consisting of: a mailer identifier, a type of mailing, a desired payment mechanism, a recipient address, a delivery constraint, pickup/drop-off constraints, a purpose for mailing, and combinations thereof.

13. The system of claim 10, wherein the processor is further operative to:
process previously received parameter information associated with the mailer; and
determine at least some values for the parameter information received from the mailer based on the processing.

14. The system of claim 10, wherein the statistical information is received by the information broker from at least one of the at least one carrier and a recipient.

15. The system of claim 14, wherein at least a portion of the statistical information received from the information broker is shared with the information broker.

16. The system of claim 10, wherein the statistical information is received according to the following: periodically, on demand, based on the occurrence of a predetermined event, and combinations thereof.

17. The system of claim 10, wherein the mailing comprises at least one of a physical document and electronic data.

18. A non-transitory medium having machine-executable instructions stored therein, the non-transitory medium comprising:
instructions to receive parameter information including delivery constraints associated with a mailer;
instructions to associate the parameter information with a mailing;
instructions to receive statistical information, the statistical information including historical delivery guarantee performance data of at least two carriers;
instructions to determine at least one routing sequence using at least one of the at least two carriers for the mailing based on the received mailer parameter information and the statistical information;
instructions to output the at least one determined routing sequence for the mailing,
instructions to analyze previously received parameter information associated with the mailer; and
instructions to determine at least some values for the parameter information received from the mailer based on the analysis, and
wherein the at least one routing sequence includes two routing sequences and outputting the at least one determined routing sequence includes outputting two routing sequences.

* * * * *